(12) United States Patent
Root

(10) Patent No.: US 9,535,881 B1
(45) Date of Patent: Jan. 3, 2017

(54) DYNAMIC FILE CONCATENATION

(71) Applicant: Amazon Technologies, Inc., Reno, NV (US)

(72) Inventor: Andrew Thomas Root, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 426 days.

(21) Appl. No.: 13/914,485

(22) Filed: Jun. 10, 2013

(51) Int. Cl.
*G06F 17/00* (2006.01)
*G06F 17/21* (2006.01)
*G06F 17/22* (2006.01)

(52) U.S. Cl.
CPC ......... *G06F 17/212* (2013.01); *G06F 17/2247* (2013.01)

(58) Field of Classification Search
CPC ............ G06F 17/2247; G06F 17/30899; G06F 17/30902
USPC ......................................................... 715/234
See application file for complete search history.

(56) References Cited

U.S. PATENT DOCUMENTS

| | | | | |
|---|---|---|---|---|
| 6,389,460 B1* | 5/2002 | Stewart | ............. | G06F 17/30899 707/999.104 |
| 2003/0117433 A1* | 6/2003 | Milton et al. | .................. | 345/738 |
| 2004/0111493 A1* | 6/2004 | Yamaguchi et al. | .......... | 709/219 |
| 2005/0243381 A1* | 11/2005 | Hill et al. | ..................... | 358/453 |
| 2006/0041554 A1* | 2/2006 | Svendsen et al. | ................ | 707/9 |
| 2006/0242238 A1* | 10/2006 | Issa | ............................... | 709/204 |
| 2011/0099514 A1* | 4/2011 | Singhal | ................ | G06F 3/0482 715/809 |

OTHER PUBLICATIONS

Combine seperate images into a single image using HTML tags, http://stackoverflow.com/questions/11293760/combineseperateimagesintoasingleimageusinghtmltags, Jul. 2, 2012, 2 pages.*
How to merge multiple images into one image—Java ImageIO, http://kalanir.blogspot.com/2010/02/howtomergemultipleimagesintoone.html, Feb. 27, 2010, 4 pages.*
Wei, Coach, "Seven Mistakes that Make Websites Slow," downloaded on Dec. 5, 2013 from http://www.sitepoint.com/seven-mistakes-that-make-websites-slow/.

* cited by examiner

*Primary Examiner* — Mohammed-Ibrahim Zuberi
(74) *Attorney, Agent, or Firm* — Knobbe, Martens, Olson & Bear, LLP

(57) ABSTRACT

Systems and methods are disclosed which facilitate dynamic generation of concatenated files. For example, one or more component images may be dynamically joined or merged to create a concatenated image file. In one aspect, a content file, such as an HTML file, may include a link or reference to a multiple component images to be included within a concatenated image. During rendering of the content file, a rendering device may transmit a request for the concatenated file to a concatenation server. The concatenation server may dynamically generate and return the concatenated image to the device. Thereafter, the concatenated image may be utilized within generated content, such as a web page. Illustratively, dynamic generation of concatenated content may facilitate use of concatenation techniques even where component content is dynamically determined or frequently changed.

24 Claims, 6 Drawing Sheets

DYNAMIC FILE CONCATENATION

BACKGROUND

Network services, such as informational services, digital goods providers, and e-commerce services, may utilize display pages (e.g., web pages) that provide relevant information to the service's users. For example, a news service may provide a display page detailing each item of available news. As a further example, an e-commerce service may provide display pages describing products or services that are available from the e-commerce site.

Display pages may include a variety of content types, such as text, images, sound and video. In general, content of a display page is described within a display page file, which may be transferred to a user's computing device prior to output of the content. Illustratively, a display page file may be written in a markup language, such as hypertext markup language (HTML). A display page file may include a subset of the content of a display page (e.g., text), while including links or pointers to other content (e.g., images, sound and/or video). Accordingly, in order to output a display page, a user's computing device may be required to make individual requests for both a display page file (e.g., an HTML document) and any additional content referenced within the display page file.

Generally, the speed at which a computing device can output a display page may be dependent at least in part on the number of requests for content which are required by a display page file. For example, a display page file which references hundreds of items of additional content may load significantly slower than a display page file which references only a single item of additional content. Due to inefficiencies caused by each request, this outcome may occur even where the total size of additional content is the same.

DETAILED DESCRIPTION

Figure 1:
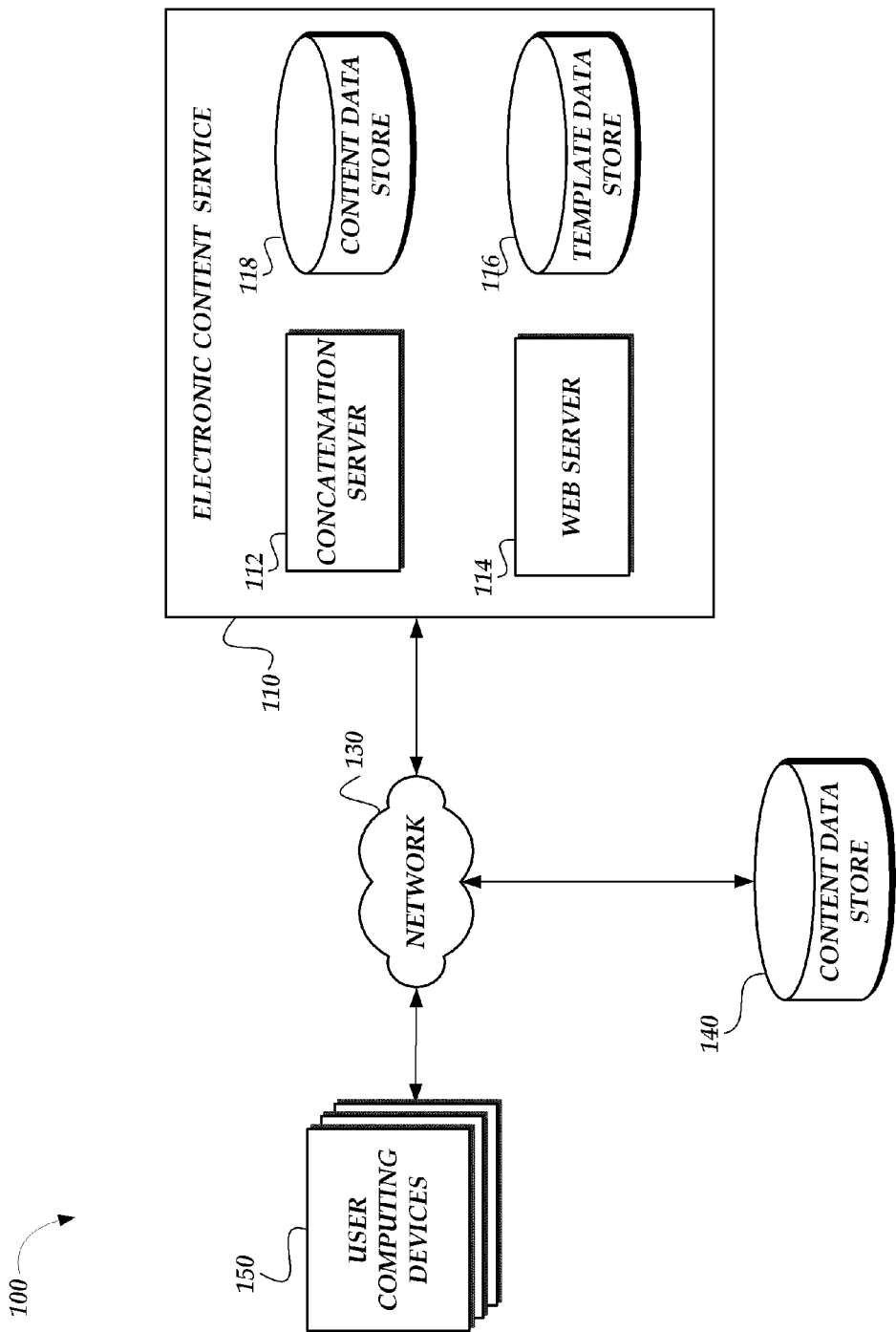
FIG. 1 is a block diagram depicting an illustrative operating environment in which an electronic content service enables users to output display pages including dynamically generated concatenated content such as concatenated images.

Generally described, aspects of the present disclosure relate to dynamic generation of concatenated content. Concatenated content may include a number of individual items of content, such as images, text, sound or video, which have been joined such that all individual content items reside within a single file. For example, a concatenated image may include or be composed of multiple images joined together within a single image file. Specifically, an electronic content service may be provided which dynamically generates items of concatenated content based on requests of user computing devices. A request may include links or pointers to individual items of content desired to be included within a concatenated content, as well as formatting parameters for the concatenated content. After receiving such a request, the electronic content service may generate a concatenated content item from the specified individual content items, and return the concatenated content item to the requesting device. Thereafter, the concatenated content item may be output by the requesting user computing device.

Illustratively, dynamically generated concatenated content may be utilized during generation of display pages for output on user computing devices. For example, a user computing device may receive a display page file, such as an HTML file, corresponding to a display page. Further, the display page file may include links or pointers to a number of additional content items, such as images, which are intended to be included within the display page. Traditionally, a user computing device may be required to individually retrieve each additional content item during generation of the display page. However, such individual retrieval may significantly slow generation of the display page, resulting in a less than optimal user experience. Accordingly, embodiments of the present disclosure may enable a user computing device to place a request to an electronic content service for a concatenated content item comprising one or more desired content items (e.g., those desired to be included within a display page). By use of such dynamically generated concatenated content, a user computing device may be enabled to retrieve a number of additional content items based on a single request. Due to a resulting reduction in the overall number of requests, generation of a display page may be completed more quickly than would traditionally be possible.

Further, because a user computing device may be enabled to specify a number of combination of content items to be included within a dynamically generated concatenated content, such concatenated content may be utilized in a wider variety of instances than pre-generated concatenated content. For example, in some instances, providers of display pages may manually or automatically combine multiple images intended to be included within a display page. Thereafter, the provider may modify the display page to include a link or pointer to the pre-generated concatenated content. For example, assume that a provider determines that a display page will include images A, B and C. The provider may thereafter pre-generate a concatenated image ABC (including images A, B and C) and modify the display page to include the concatenated image ABC, rather than individual images A, B and C. However, because such a display page includes a pointer to pre-generated concatenated content, the component content items included within the pre-generated concatenated content must also be predetermined. Illustratively, assume that a provider desires a display page to include a dynamic selection of only two of the three images A, B and C (e.g., images A and B, images A and C, or images B and C). In order to utilize pre-generated concatenated images for such a display page, the provider would be required to pre-generate a concatenated image AB, a concatenated image AC, and a concatenated image BC. Further, the complexity required to pre-generate concatenated images grows exponentially with the number of desired component images. For example, assume that an e-commerce service offering hundreds of thousands of items wishes to utilize concatenated images to display individual product images for five recommended items. If the e-commerce service utilized pre-generated concatenated images, a concatenated image would need to be generated for each combination of five items offered by the e-commerce service. One skilled in the art will appreciate that the processing power required to pre-generate such images, and the storage required to maintain them, would likely outweigh the benefit of their use.

Accordingly, embodiments of the present application may enable an electronic content service to dynamically generate desired concatenated content, such as during output or rendering of a display page. Illustratively, dynamic generation may reduce the need to pre-generate and maintain multiple items of concatenated content, especially when the component content is subject to frequent change or variation. For example, where an e-commerce wishes to utilize a concatenated image to represent a collection of item recommendations, a display page file (e.g., an HTML page) may be generated indicating each item recommendation to be included within the concatenated image. Illustratively, an HTML page may include a dynamic concatenated image universal resource locator (URL) formatted to identify each component image, such as "http://ecatalog.tld/concatenate=imageA+imageB+imageC" (where "ecatalog.tld" represents an electronic catalog service, "concatenate" indicates a request to generate a dynamically concatenated file, and "imageA," "imageB," and "imageC" identify the component images of the dynamically concatenated file). Because the locations of each component image are identified individually, the display page file may be easily modified to include other concatenated images. For example, an electronic catalog service may utilize server-side or client-side scripting techniques to automatically modify an HTML file to reference any set of images. Illustratively, if an electronic catalog service is configured to recommend items X, Y, and Z (corresponding to images X, Y, and Z, respectfully) to a customer, an HTML file may be modified to include the URL "http://ecatalog.tld/concatenate=imageX+imageY+imageZ." Other aspects of an HTML document, such as interactive elements, may therefore be agnostic as to which component images are included within a concatenated image. Further, utilization of dynamically generated concatenated images may eliminate the need to generate a concatenated image prior to providing a display page file (e.g., HTML file) to a user computing device.

Illustratively, a user computing device may attempt to access a display page on an electronic catalog system. In order to access this display page, the user computing device may transmit a request for an HTML file corresponding to the display page. In response, the electronic catalog system may generate an appropriate HTML file (e.g., from a HTML template), and return the generated HTML file to the user computing device. In some instances, generation of the HTML file may include selection of one or more dynamic images to be included within the HTML file. For example, the electronic catalog system may select three images of recommended products, images A, B and C, to be included within the HTML. Illustratively, the electronic catalog system may place identifying information for each image within a URL associated with a dynamic concatenation service. After receiving the HTML file, the user computing device may render the HTML file, which may include making a request to the URL associated with a dynamic concatenation service. The dynamic concatenation service, in turn, may receive the request for the URL (including identifying information for each image A, B and C), and generate a concatenated image comprising images A, B and C. The generated concatenated image may then be returned to the user computing device, where it may be included within a display page rendered based on the HTML file.

Because a portion of the functionality described above may be pre-existent within the electronic catalog system and/or the user computing device, transitioning from use of non-concatenated images to dynamically concatenated images may be relatively simple. Illustratively, functionality to select dynamic images and to render URLs within an HTML file may be pre-existent within the electronic catalog service and/or user computing device. Accordingly, the use of dynamically concatenated images may require only provision of a dynamic image concatenation service and modification of a template from which an HTML file is generated.

Though portions of the present disclosure are described with respect to concatenated images, embodiments of the present disclosure may further relate to additional or alternative concatenated file types, such as concatenated audio files, concatenated document files, concatenated text files, etc. Each concatenated file may represent a combination of multiple files into a single file of a corresponding type or format. For example, multiple JavaScript files may be combined into a single JavaScript file, or multiple audio files may be combined into a single audio file. One aspect of a concatenated file may be that the content of each component file (from which the concatenated file is formed) may be accessed directly from a single file, rather than maintaining individuality between the component files. Illustratively, this aspect may distinguish concatenated files from other file types, such as container files (e.g., a Zip file format), which generally contain multiple, individual component files.

With reference now to FIG. 1, a block diagram is shown depicting an illustrative operating environment 100 in which an electronic content service 110 enables customers to browse content, such as goods or services offered for acquisition. Moreover, in accordance with aspects of the present disclosure, the electronic content service 110 may include a concatenation server 112 configured to dynamically generate concatenated images. As illustrated in FIG. 1, the operating environment 100 includes one or more user computing devices 150 in communication with the electronic content service 110 via a network 130. A user computing device 150 may be any computing device, such as personal computer (PC), kiosk, thin client, home computer, and dedicated or embedded machine. Further examples may include a laptop or tablet computers, servers, personal digital assistant (PDA), hybrid PDA/mobile phones, mobile phones, electronic book readers, set-top boxes, cameras, digital media players, and the like. In some instances, user computing devices 150 may represent end users of the electronic content service 110 (e.g., users wishing to browse or acquire goods or services from the electronic catalog system).

The network 130 may be any wired network, wireless network or combination thereof. In addition, the network 130 may be a personal area network, local area network, wide area network, cable network, satellite network, cellular telephone network, or combination thereof. Protocols and components for communicating via any of the other aforementioned types of communication networks are well known to those skilled in the art of computer communications and thus, need not be described in more detail herein.

The electronic content service 110 is illustrated in FIG. 1 as operating in a distributed computing environment comprising several computer systems that are interconnected using one or more networks. More specifically, the electronic content service 110 may include a web server 114, a templates data store 116, a concatenation server 112, and an content data store 118, each of which will be discussed in greater detail below. However, it may be appreciated by those skilled in the art that the electronic content service 110 may have fewer or greater components than are illustrated in FIG. 1. In addition, the electronic content service 110 could include various Web services and/or peer-to-peer network configurations. Thus, the depiction of the electronic content service 110 in FIG. 1 should be taken as illustrative and not limiting to the present disclosure.

Any one or more of the web server 114, the templates data store 116, the concatenation server 112 and the content data store 118, may be embodied in a plurality of components, each executing an instance of the respective web server 114, templates data store 116, concatenation server 112 and content data store 118. A server or other computing component implementing any one of the web server 114, the templates data store 116, the concatenation server 112 and the content data store 118 may include a network interface, memory, processing unit, and computer readable medium drive, all of which may communicate with each other by way of a communication bus. For example, an included network interface may provide connectivity over the network 130 and/or other networks or computer systems. A processing unit (as included in any of the components discussed above) may communicate to and from memory containing program instructions that the processing unit executes in order to operate the web server 114, templates data store 116, concatenation server 112 and content data store 118. An included memory may generally include RAM, ROM, other persistent and auxiliary memory, and/or any non-transitory computer-readable media.

With further reference to FIG. 1, illustrative components of the electronic content service 110 will now be discussed. The web server 114 may facilitate interaction with the electronic content service 110, such as via the Hypertext Transfer Protocol (HTTP) and various web pages. For example, the web server 114 may facilitate generation of display pages by user computing devices 150. Illustratively, the web server 114 may provide one or more display page files (e.g., in accordance with an HTML format or derivative formats) to a user computing device 150. The web server 114 may further provide additional content files, such as images, text, audio, or video (e.g., as referenced within an HTML file). Further, the web server 114 may facilitate browsing, searching and interacting with the electronic content server 110. Display page files, such as HTML files, provided by the web server 114 may be generated based at least in part on content templates stored within the template data store 116, which may correspond to any data store or collection of data stores, such as hard disk drives (HDDs), solid state drives (SSDs), tape drives, network attached storage (NASs) or any other persistent or substantially persistent storage component. As will be appreciated by one skilled in the art, content templates may include a variety of content types, such as text, audio, images or video, and may further include links to additional content. Further, content templates may include information for determining dynamic content. For example, a content template may include instructions for the web server 114 to determine one or more images to reference within a generated display page file just prior to sending the display page file to a user computing device 150.

Illustratively, content referenced within content templates may be stored within a content data store 118 associated with the electronic content server 110, or within a content data store 140 external to the electronic content server 110. Similarly to the template data store 116, content data stores 118 and 140 may correspond to any data store or collection of data stores, such as hard disk drives (HDDs), solid state drives (SSDs), tape drives, network attached storage (NASs) or any other persistent or substantially persistent storage component. As will be described in more detail below, the electronic content service 110 and/or the user computing devices 150 may interact with either or both content data stores 118 and 140 to retrieve content for use in generating display pages. Illustratively, the content data store may include any text, audio, images, video or other content referenced within display pages generated by the web server 114.

The electronic content service 110 may further include a concatenation server 112 operable to dynamically generate concatenated files in response to requests from the user computing devices 150 and/or the web server 114. As will be described in more detail below, the concatenation server 112 may receive a request specifying two or more content files (e.g., images) to be combined into a concatenated content file. Thereafter, the concatenation server 112 may retrieve the requested content (e.g., from one or both of content data stores 118 and 140), and generate a concatenated content file comprising the requested content. The concatenation server 112 may then return the dynamically generated concatenated file to the requesting user computing device 150. Accordingly, the user computing device 150 may be enabled to obtain each item of requested content with a single request to the concatenation server 112. Moreover, because the concatenation server 112 may have more reliable, efficient, or rapid access to the requested content, the overall time required to obtain the requested content at the user computing device 150 may be reduced. User experience at the user computing device 150 may therefore be improved.

Though not shown in FIG. 1, in some embodiments the concatenation server 112 may include or otherwise be associated with a cache configured to temporarily store generated concatenated files, component files, or additional information. For example, the concatenation server 112 may be configured to store all or a portion of generated concatenated files into the cache subsequent to generation. Such a cache may facilitate rapid fulfillment of subsequent requests for the cached file (e.g., by servicing the request from the cache, rather than regenerating the concatenated file). As a further example, the concatenation server 112 may be configured to cache all or a portion of component files use to generate concatenated files. Illustratively, the concatenation server 112 may cache any retrieved file which took more than a threshold amount of time to retrieve, or which was retrieved from an external data store. In this manner, subsequent concatenated files may be generated based on the cached component file, rather than requiring a second retrieval of the component file.

Though details of the present disclosure will be described with respect to an concatenation server 112 associated with the electronic content service 110, in some embodiments, a concatenation server 112 may be provided which is distinct from the electronic content service 110. For example, the electronic content server 112 may provide user computing devices 150 with display page files (e.g., HTML files) which reference a dynamically generated concatenated file available from a distinct concatenation server 112. In other embodiments, a concatenation server 112 associated with the electronic content service 110 may be made available to other electronic content services. Illustratively, other electronic content services may include, within their associated display page files, references to dynamically generated concatenated files available from the concatenation server 112 shown in FIG. 1. Accordingly, the concatenation server 112 may be configured to dynamically generate concatenated images based on requests from a variety of sources.

Further, as noted above, though portions of the present disclosure are described with respect to concatenated images, embodiments of the present disclosure may further relate to additional or alternative concatenated file types, such as concatenated audio files, concatenated document files, concatenated text files, etc. Each concatenated file may represent a combination of multiple files into a single file of a corresponding type or format. Accordingly, a user computing device 150 may be enabled to access the content of each individual file within a single, combined file, as opposed to being required to open multiple, individual files.

Figure 2A:
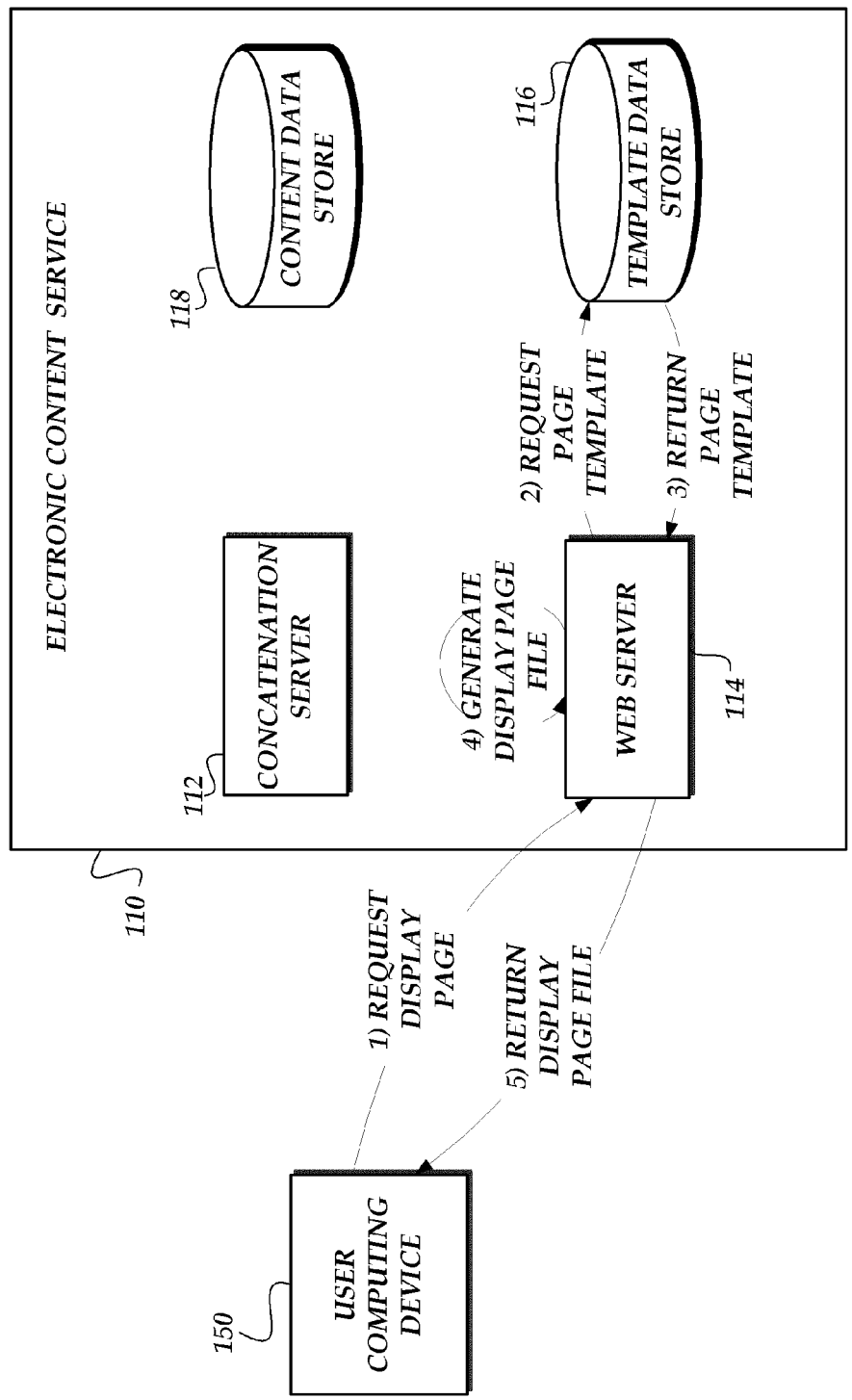
FIG. 2A is a block diagram depicting the generation and transmission of a display page file to a user computing device by the electronic content service of FIG. 1.
Figure 2B:
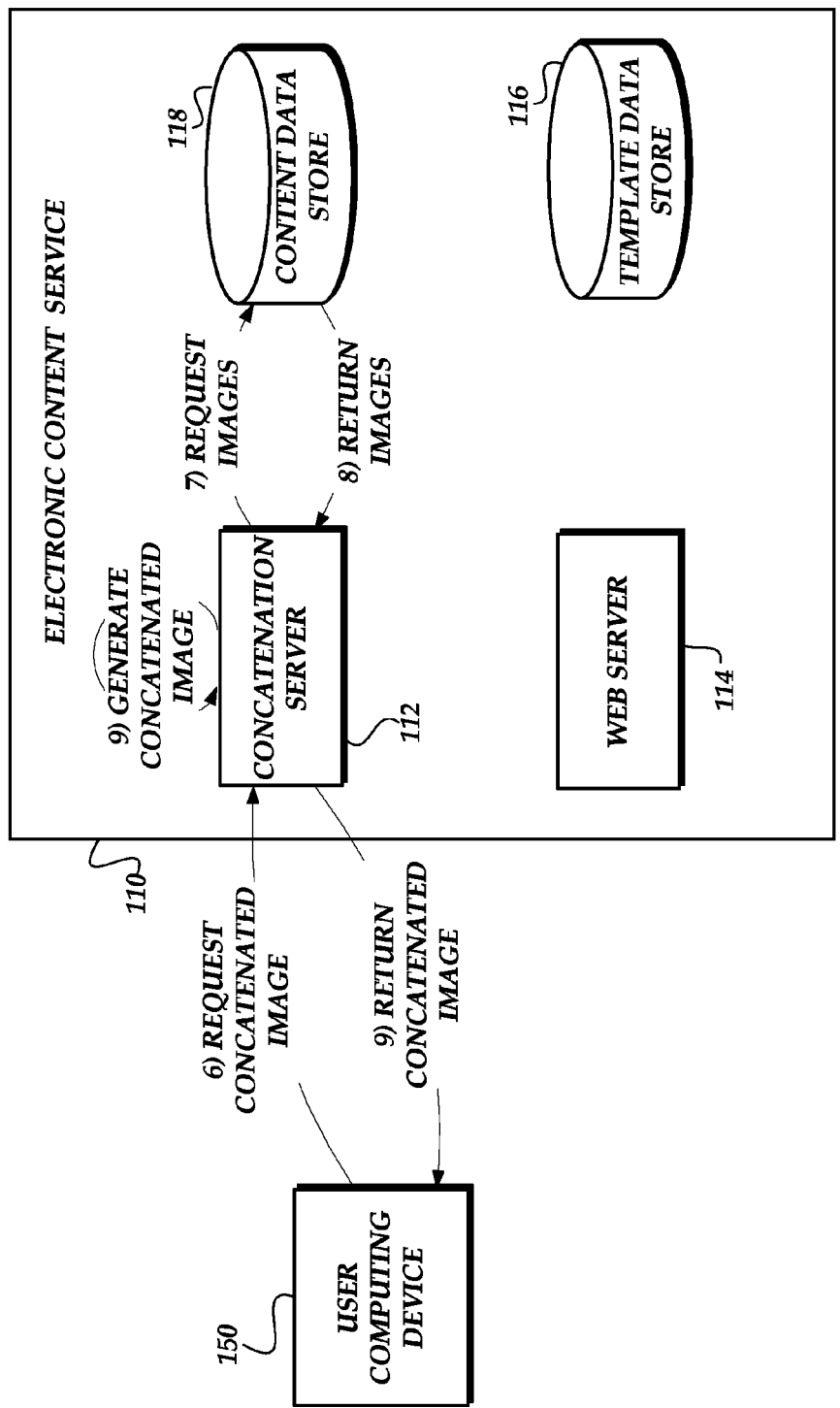
FIG. 2B is a block diagram depicting the generation and transmission of dynamically generated concatenated content to a user computing device by the electronic content service of FIG. 1.

With reference to FIGS. 2A and 2B, illustrative interactions for generating a display page file referencing concatenated content dynamically generated by the electronic content service 110 of FIG. 1 will be described. Specifically, FIG. 2A depicts an illustrative interaction for generating and providing a display page file referencing dynamically generated concatenated content to a user computing device 150. FIG. 2B depicts an illustrative interaction for dynamically generating concatenated content in response to a request from a user computing device 150, which may be transmitted during generation of a display page by the user computing device 150. Though each of the illustrative interactions of FIGS. 2A and 2B could occur independently, numbering is maintained throughout FIGS. 2A and 2B for simplicity.

With reference to FIG. 2A, an illustrative interaction for generating a display page file referencing dynamically generated concatenated content, and for transmitting the display page file to a user computing device 150 will be described. A display page file may generally include any information and/or instructions enabling a user computing device 150 to generate a display page for output. For example, a display page file may correspond to an HTML document, extensible markup language (XML) document, a JavaScript document, a cascading style sheet (CSS) document, or any combination therein. One skilled in the art will appreciate that display page files may correspond to or include content of any number of various languages, formats or styles.

Specifically, at (1), a user computing device 150 may transmit a request for a display page to the web server 114. Illustratively, such a request may be transmitted as an HTTP request from an application on the user computing device 150, such as a web browser. The requested display page may correspond to any information available from the electronic content service 110, such as a news item, a document, or textual, audio, or video content. In one embodiment, the display page may include information regarding items (physical, digital or otherwise) available for purchase via the electronic content service 110. One example of such a display page will be described below with respect to FIGS. 3A and 3B.

After receiving a request for a display page, the web server 114 may attempt to generate a display page file, such as an HTML file, corresponding to the requested display page. In one embodiment, the display page file may be dynamic, such that the content of the display page file is dependent on one or more variables. For example, the display page file may be altered based on the time of day, the number of times the display page has been requested, or the identity of the requesting user computing device 150. Illustratively, where the user computing device 150 has a user account with the electronic content service 110, the display page may be altered to reflect that account. As will be described in more detail below, a display page file may be generated which includes a reference to dynamically generated concatenated content, such as a concatenated image file. Illustratively, the component content within the dynamically generated concatenated content may itself be dynamically determined. For example, concatenated content may be dynamically generated to include a selection of images determined based on the identity of the user computing device 150.

In order to facilitate generation of a dynamic display page file, the web server 114 may, at (2), request a page template from the template data store 116. Generally described, a page template may correspond to any set of information or instructions enabling the web server 114 to generate a display page file for transmission to a requesting user computing device 115. Illustratively, a page template may include an HTML file including server-side scripting, which may correspond to instructions implemented by the web server 114 prior to transmitting a generated display page file to the user computing device 150. For example, server-side scripting may include coding written in languages such as active server pages (ASP), common gateway interface (CGI), Java, Perl, PHP, Python or Ruby. Illustratively, where the requested display page corresponds to an item available for purchase on the electronic content server 110, a page template may include instructions regarding a layout of the display page, links to databases or other data stores from which to retrieve item information, and instructions regarding dynamic content that may be included within the display page (e.g., recommendations for other items). In one embodiment, the page template may include a reference to, or instructions sufficient to determine, dynamically generated concatenated content available from the concatenation server 112. For example, the page template may include a reference to a dynamically generated concatenated image comprising a set of images that are selected based on an identity user computing device 150. After receiving the request for the page template, the template data store 116 may return the requested page template to the web server 114 at (3).

Subsequently, the web server 114 may utilize the page template at (4), along with any necessary additional information, to generate a display page file for subsequent transmission to the user computing device 150. Illustratively, generation of a display page file may include execution of instructions within a previously retrieved page template to generate an HTML or HTML compatible document. For example, where a page template includes a reference to a dynamically generated concatenated image including dynamically selected images, generation of a display page file may include both dynamically selecting such images, and including a reference to such image within the display page file. Illustratively, assume that a page template retrieved by the web server 114 corresponds to an item available for purchase. Further assume that the page template includes a reference, such as a URL, to a dynamically generated concatenated image (e.g., "http://ecatalog.tld/concatenate?="), and includes instructions for determining a set of three component images to be included within the concatenated image. Based on this information, the web server 114 may be configured to determine three images, such as images A, B and C, and to include a reference to a corresponding dynamically generated concatenated image within the generated display page file. Illustratively, the generated display page file may include the URL "http://ecatalog.tld/concatenate?=imageA+imageB+imageC." In some embodiments, a generated URL may include additional or alternative parameters, such as a desired layout of a concatenated image, a desired size of one or more images within a concatenated image, a desired size of a concatenated image, a desired format of a concatenated image (e.g., including a desired compression or compression format), or a desired distance between images within the concatenated image (e.g., a buffer distance). In one embodiment, one or more of such parameters may be required for generation of a concatenated file. In another embodiment, one or more of such parameters may be optional. Still further, in some embodiments, required or optional parameters for generation of a concatenated file may be predetermined (e.g., by the electronic content server 110). In other embodiments, the use of such parameters may depend at least in part on a desired format of a requested concatenated file, or the component files desired to be included within the requested concatenated file. For example, a first set of one or more parameters may be available when requesting a concatenated JPEG format file (e.g., as denoted within the JPEG format specification), while a second set of one or more parameters may be available when requesting a concatenated GIF format file (e.g., as denoted within the GIF format specification). As will be described below, a generated URL described above, including any additional parameters, may correspond to a request to the concatenation server 112 to dynamically generate a concatenated image including images A, B and C. After generating a display page file for the requested display page, the web server 114 may return the generated display page file to the user computing device 150.

Though a portion of the interactions of FIG. 2A are described with respect to utilization of server-side scripting, embodiments of the present disclosure may additionally or alternatively utilize other scripting techniques or technologies. For example, a display page may include client-side scripting, such as JavaScript, to determine dynamically selected content for inclusion within a dynamically generated concatenated file. Additional examples of entirely or partially client-side techniques include CSS, XML, asynchronous JavaScript and XML (AJAX) and extensible HTML (XHTML).

With reference to FIG. 2B, an illustrative interaction for dynamically generating concatenated content during generation of a display page will be described. In one embodiment, the interactions of FIG. 2B may occur subsequent to the actions of FIG. 2A. For example, where a display page file including a reference to a dynamically generated concatenated content is returned to a user computing device 150, the interactions of FIG. 2B may occur during generation of a corresponding display page.

Specifically, at (6), the user computing device 150 may request a concatenated image from the concatenation server 112. Such a request may be generated based on a display page file retrieved by the user computing device 150. Illustratively, assume that the display page file includes the URL "http://ecatalog.tld/concatenate?=imageA+imageB+imageC," where the address portion "ecatalog.tld/concatenate" references the concatenation server 112. Under these circumstances, the user computing device 150 may be configured to make a request for the concatenated image from the concatenation server during typical processing of the display page file.

Subsequent to receiving a request for a dynamically generated concatenated image, the concatenation server 112 may, at (7), request any component images from a corresponding content data store. In one embodiment, the request for a concatenated image may not specify a location of each of the requested images. In these embodiments, the concatenation server 112 may be configured to attempt to locate the requested images within a predefined content data store, such as content data store 118. The concatenation server 112 may further be configured to attempt to locate the requested image from alternative content data stores, such as other content data stores (not shown in FIG. 2B) associated with the electronic content server 110. In other embodiments, the request for a concatenated image may include information regarding the location of one or more requested images, such as a content data store storing the requested images (e.g., content data store 118 or content data store 140 of FIG. 1). In either embodiment, where a requested image cannot be located by the concatenation server 112, the concatenation server 112 may be configured to return an error message to the user computing device 150. For the purposes of discussion of FIG. 2B, it will be assumed that each of the images to be included within the requested concatenated image are contained within the content data store 118. Accordingly, at (8), the content data store may return the requested images to the concatenation server 112.

Thereafter, at (9), the concatenation server may 112 may utilize the retrieved images to generate a concatenated image. The generation of concatenated content, in general, may include combining each component content item or file into a single concatenated content item or file. For example, generation of a concatenated image may include replicating or copying the content of each component image into a single, larger image file. Illustratively, where three component images, each 100 pixels high by 100 pixels wide, are placed within a concatenated image, the resultant concatenated image may be 100 pixels high by 300 pixels wide. In such an example, the first 100 pixels of width may represent the first component image, the second 100 pixels of width may represent the second component image, and the third 100 pixels of width may represent the third component image. One skilled in the art will appreciate that alternate or additional configurations of component images may be possible. For example, where four component images are combined into a concatenated image, the concatenated image may include the component images in a 4 by 1, 2 by 2, or 1 by 4 configuration. Further, though concatenated images may include content solely from component images, in some embodiments, concatenated images may include additional content placed by the concatenation server 112. For example, the concatenation server 112 may place buffer content between each component image, such that it is more convenient to display an individual image. As a further example, the concatenation server 112 may place buffer content around images of various sizes in order to allow creation of a concatenated image of a standardized size. The concatenation server 112 may further be configured to modify the concatenated image or any component image as necessary for use by the user computing device 150 (e.g., by resizing, reshaping, modifying colors or color quality, modifying resolution, etc.). Thereafter, the concatenated image may be returned to the user computing device 150 at (9). As will be described below, the user computing device 150 may then utilize the concatenated images (e.g., in a display page).

Though description is made in FIG. 2B to concatenated image files, the concatenation server 112 may further be configured to generate alternative concatenated content. In some embodiments, the interactions of FIG. 2B may be modified to facilitate dynamic generation of audio, video or textual content. Illustratively, the concatenation server 112 may be configured to receive a request for a concatenated JavaScript file including three identified JavaScript files. For example, each JavaScript file may include code utilized during generation of a display page. Accordingly, the concatenation server 112 may retrieve the relevant JavaScript files, and generate a single JavaScript file including each component file. In this manner, display pages may reference any number of dynamically selected JavaScript files, and retrieve a concatenated JavaScript file (including a combination of the required code) by use of only a single request.

In addition, though illustrative interactions are described above with respect to FIGS. 2A and 2B, one skilled in the art will appreciate that additional or alternative interactions may occur with respect to the electronic content service. For example, as discussed above, the concatenation server 112 may in some instance be associated with a cache of generated concatenated files, component files, or both. Accordingly, in some embodiments, the interactions described above may be modified to include retrieval of component files or previously generated concatenated files from such a cache.

Figure 3A:
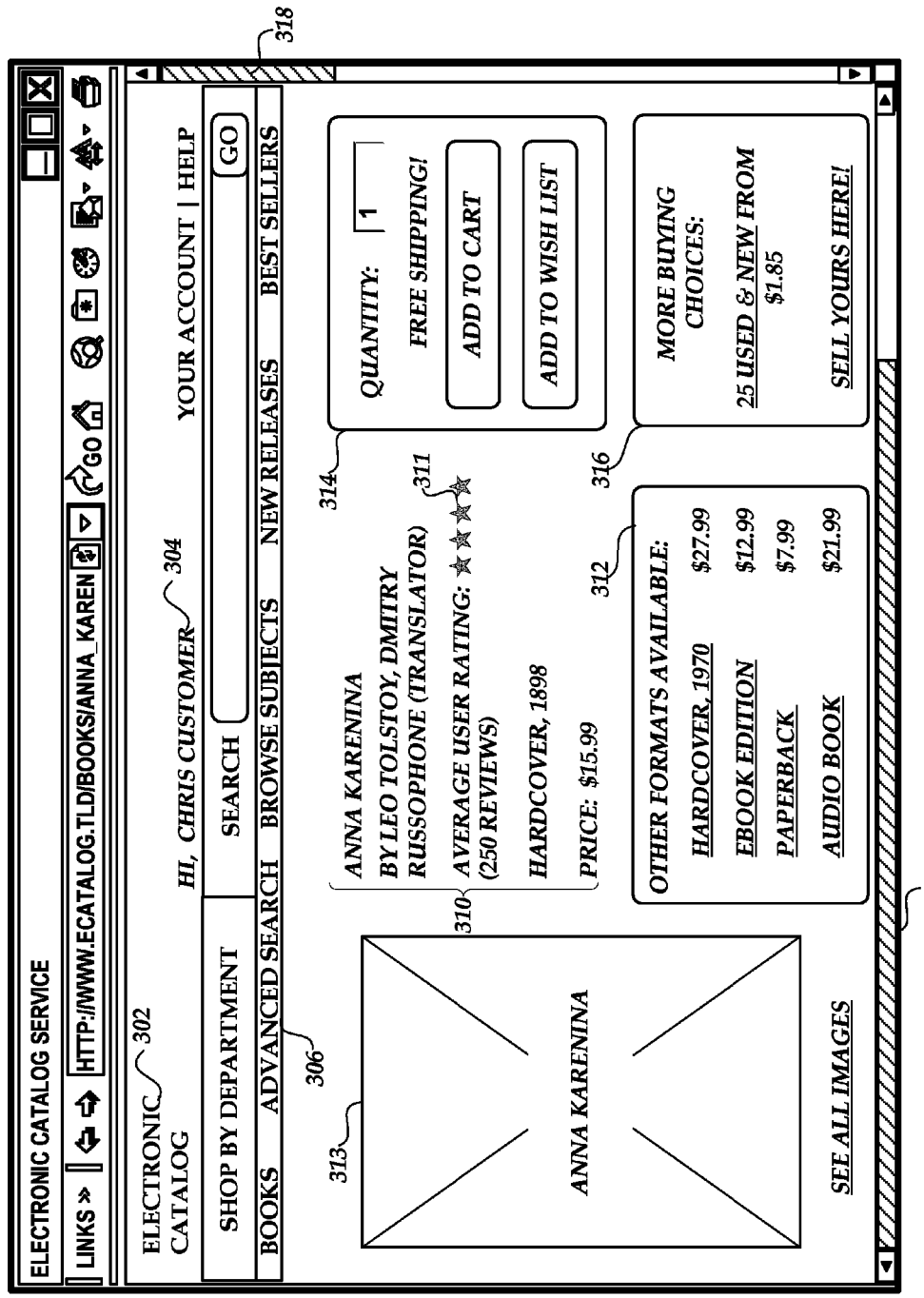
FIG. 3A depicts an illustrative user interface displayed on a user computing device that reflects a first portion of a display page generated based on a display page file provided by the electronic content service of FIG. 1.
Figure 3B:
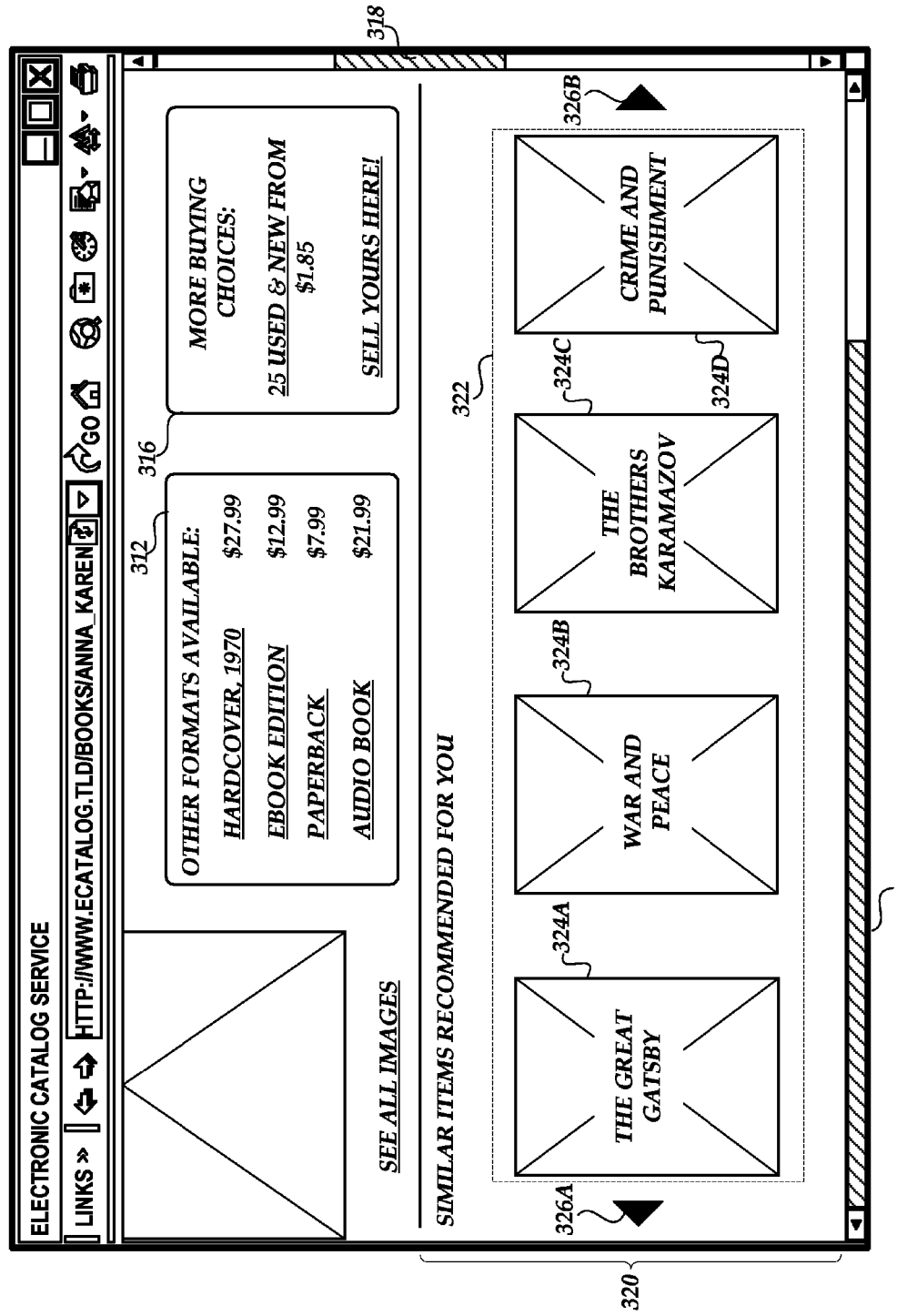
FIG. 3B depicts an illustrative user interface displayed on a user computing device that reflects a second portion of the content item of FIG. 3A, including dynamically generated concatenated content.

With reference to FIGS. 3A and 3B, illustrative user interfaces for output of a display page including dynamically generated concatenated content will be described. Specifically, FIG. 3A depicts an illustrative user interface 300 including a first portion of a display page, while FIG. 3B depicts an additional user interface 350 including a second portion of the display page. While described as individual user interfaces, one skilled in the art will appreciate that user interfaces 300 and 350 may represent a single interface (e.g., at different points in time).

With reference to FIG. 3A, an illustrative user interface 300 for outputting a display page corresponding to the electronic content service 110 of FIG. 1 will be described. Specifically, the user interface 300 may be generated by an application or program, such as a web browser, of a user computing device 150 in response to reception of a display page file from the electronic content service 110. In the embodiment depicted by FIG. 3A, the display page may include information regarding an item available for acquisition from the electronic content service 110. As shown in FIG. 3A, the user interface 300 provides information retrieved from the electronic content service 110, i.e., the "Electronic Catalog" 302 to "Chris Customer" 304, an illustrative user accessing the "Electronic Catalog" 302. Currently, the display page 300 depicts information for the novel "Anna Karenina," written by Leo Tolstoy, as reflected in feature 310. The feature 310 includes additional information, such as the identity of the translator, an average user rating (based on a number of reviews), the current price of the item, etc. Features 312-316 reflect still more information regarding the item. Feature 312, for example, reflects other formats of the item available from the electronic content service 110. Feature 313 is a graphic associated with the item, such as a photograph of the item. Feature 314 and 316 reflect primary acquisition options (e.g., purchasing from a preferred vendor) and secondary acquisition options (e.g., purchasing from additional vendors), respectively. Though illustrative features regarding an item are discussed herein, one skilled in the art will appreciate that any combination of features may be included and/or displayed within display page.

With reference to FIG. 3B, a second illustrative user interface 350 is depicted, including additional information regarding the item described above with respect to FIG. 3A. As will be appreciated by one skilled in the art, FIG. 3B may represent a user interface displayed by a user computing device 150 in response to user interaction with elements of the user interface 300 of FIG. 3A, such as scroll bar 318. Accordingly, the user interface 350 may represent a second portion of a display page generated by the user computing device 150. Because FIG. 3B depicts many of the same interface elements as FIG. 3A (e.g., elements 312 and 316), these elements will not be again described.

In addition, user interface 350 includes a recommendation portion 320 regarding additional items available from the electronic catalog 302 and recommended for "Chris Customer." Specifically, recommendation portion 320 includes a concatenated image 322, which includes content corresponding to a number of component images 324A-324D. Illustratively, the concatenated image 322 may be included within the display page based on a reference, such as a URL, within a display page file transmitted from the electronic content server 110. For example, a display page file corresponding to the display page of FIG. 3B may include a URL referencing the concatenation server 112 of FIG. 1 and identifying each component image 324A-324D. Accordingly, during generation of the user interface 350, a user computing device 150 may make a request to the concatenation server 112 for a dynamically generated concatenated image corresponding to component image 324A-324D. Thereafter, the concatenation server 112 may return concatenated image 322 for inclusion within the user interface 350. Though, in the example of FIG. 3B, the concatenated image 322 represents a single image file, this fact may not be immediately apparent to a user viewing the user interface 350. For example, the portion of the concatenated image 322 not directly corresponding to component images 324A-324D may be made the same or a similar color to a background of the user interface 350. In this manner, a user viewing the user interface 350 may be unable or unlikely to distinguish the concatenated image 322 from display of the component images 324A-324D individually. Further, one skilled in the art will appreciate that the display page may be configured such that interaction with different portions of the concatenated image 322 may be controlled differently. For example, user selection of the portion of the concatenated image 322 corresponding to component image 324A ("The Great Gatsby") may redirect the user interface 350 to a display page regarding a corresponding book. Moreover, additional content items, such as descriptive text, pricing information, etc., may be overlaid or placed nearby the content of each component image 324A-324D, such that a user viewing the user interface 350 regards the images individually. Accordingly, there may be little or no distinguishable difference between a user interface utilizing individual component images 324A-324D (not shown in FIG. 3B), and the user interface 350 utilizing concatenated image 322. However, as described above, generation of the user interface 350 may be substantially faster than generation of a user interface utilizing individual component images 324A-324D, due to a reduced number of requests for images.

In some embodiments, all or a portion of a concatenated image, such as concatenated image 322, may be hidden from the user interface 350 at a given point in time. For example, assume that the electronic catalog 302 is configured to provide recommendations for 20 items available for purchase, but that the user interface 350 is only capable of displaying recommendations for 4 items. Accordingly, the user interface 350 may include navigational controls 326A and 326B for modifying the currently displayed recommended items. Illustratively, user selection of 326A may cause removal of the rightmost component image 324D (e.g., "Crime and Punishment"), and addition of an additional component image. Similarly, user selection of 326B may cause removal of the leftmost component image 324A (e.g., "The Great Gatsby"), and addition of an additional component image. In order to facilitate such interaction, the concatenated image 322 may include content corresponding to multiple component images, including those not displayed by the user interface 350. As will be appreciated by one skilled in the art, a display page may be configured such that portions of an image, such as concatenated image 322 are hidden from display. Accordingly, user selection of navigational controls 326A and 326B may cause different portions of a concatenated image 322 (e.g., corresponding to different component images) to be displayed. In this manner, any number of item recommendations may be included within a single concatenated image and retrieved based on a single request.

Further, in some embodiments, multiple concatenated images may be utilized within a display page. For example, a first concatenated image 322 may include content corresponding to component images 324A-324D, while a second concatenated image (not shown in FIG. 3B) may include content corresponding to four additional component images (also not shown in FIG. 3B). Accordingly, user selection of navigational controls 326A and 326B may cause the user interface 350 to display both a portion of the first concatenated image 322 and a portion of the second concatenated image. Illustratively, use of multiple concatenated images may enable the display page to load an initially displayed concatenated image quickly, while delaying the processing and/or communication necessary to load initially hidden concatenated images.

Figure 4:
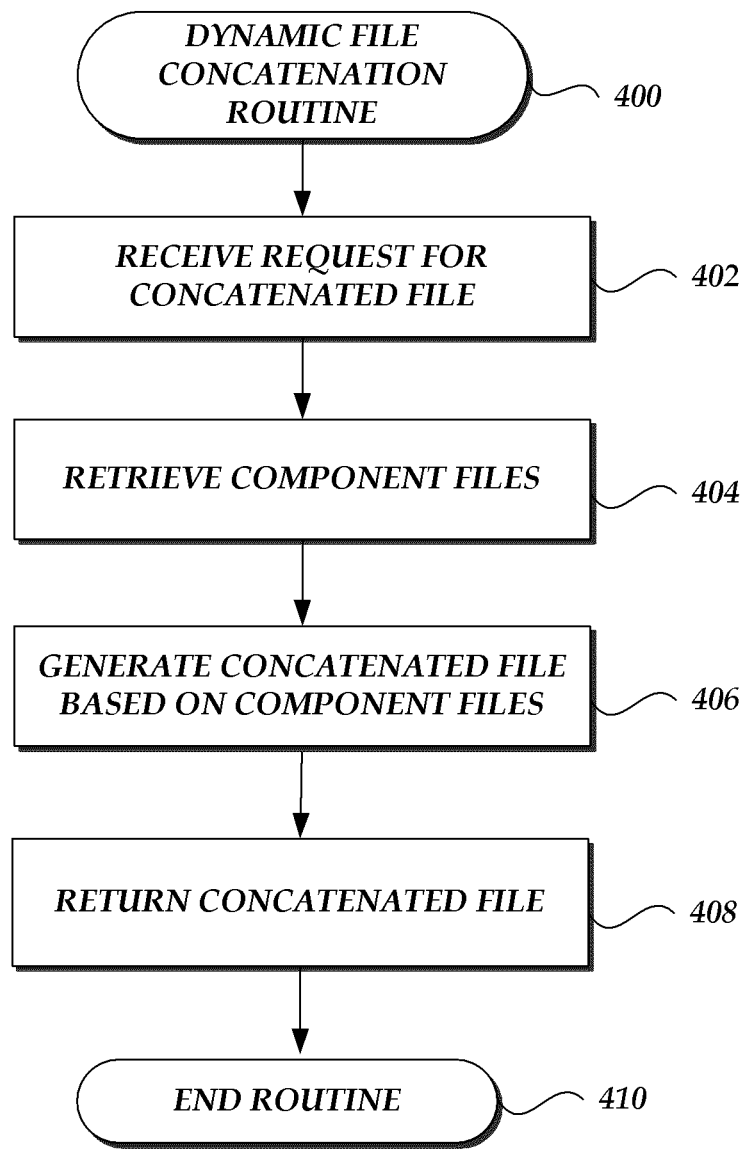
FIG. 4 is a flow diagram depicting an illustrative routine for dynamically generating concatenated content during rending of a display page file by a user computing device.

With reference to FIG. 4, one example of an illustrative routine 400 for dynamically generating a concatenated file, such as a concatenated image file, will be described. The illustrative routine 400 may be carried out, for example, by the concatenation server 112 of FIG. 1 in response to a request from a user computing device 150. In one embodiment, the illustrative routine 400 may be carried out in real-time or substantially real-time during generation of a display page on a user computing device. For example, the routine 400 may be carried out to service a request for a concatenated image identified within a display page being generated on a user computing device 150.

The routine 400 may begin at block 402, where the concatenation server 112 receives a request for a concatenated file (e.g., from a user computing device 150). The request may include identification of one or more component files or contents. For example, where the requested file is a concatenated image, the request may include identifiers for each image to be included within the concatenated image. In some embodiments, the request may include additional information regarding the images, such as a location from which each component image may be retrieved (e.g., a URL, an identifier of a data store, etc.). In still more embodiments, the request may specify additional parameters for the concatenated image or generation thereof, such as a desired order or configuration of the component files within the concatenated file, additional content to be included (e.g., buffers between component files), colors of additional content, or any other parameters that may be used by the concatenation server 112 in generating a concatenated file.

Thereafter, at block 404, the concatenation server 112 may retrieve the component files identified within the received request. In one embodiment, the identified files may be more easily accessible to the concatenation server 112 than to the requesting device, such that the time required by the concatenation server 112 to retrieve each component file is less than the time a requesting device would require to retrieve the component files. For example, each component file may be local to the concatenation server 112 or accessible to the concatenation server 112 via a LAN. In other embodiments, one or more of the component files may be remote from the concatenation server 112 (e.g., accessible over a WAN).

At block 406, the concatenation server 406 may utilize the retrieved component files to generate a concatenated file. As described above, the generation of concatenated content may include combining each component content item or file into a single concatenated content item or file. For example, generation of a concatenated image may include replicating or copying the content of each component image into a single, larger image file. Illustratively, three component images of 1 million pixels (one megapixel) may be concatenated to generate a single, 3 million pixel file. Accordingly, generation of a concatenated file may include specialized software, such as commonly available editing applications, to open or access the content of each component file, and to generate a single file containing the entirety of the substantive content of the component files. One skilled in the art will appreciate that non-substantive content, such as metadata, file headers, or other extraneous information of each component file may, in some embodiments, be omitted from a concatenated file. Further, though a concatenated file may generally be of the same content type (e.g., document, audio, video, text, etc.) as each component file, in some embodiments the concatenation server 112 may be configured to alter the specific format in which the content is stored. For example, the concatenation server 112 may be configured to generate JPEG format image file from multiple bitmap formatted component images. Similarly, the concatenation server 112 may be configured to generate a single MP3 format audio file from multiple waveform audio (WAV) formatted files. In some embodiments, the concatenation server 112 may be configured to select a most appropriate format for a generated concatenated file (e.g., by inspecting individual formats of each component file).

Subsequent to generation, the requested concatenated file may be returned to the requesting device at block 408. Illustratively, transmission of the concatenated file may occur via HTTP (e.g., as with typical image files). Accordingly, from the point of view of a user of the device requesting the concatenated file, the routine 400 may be entirely or largely transparent. Thereafter, the concatenated file may be utilized as required by the requesting device. For example, the requesting device may place all or a portion of the concatenated file into a display page accessible to a user. Accordingly, the content of each component file may be available to the requesting device based on a single request to the concatenated server 112, and overall speed and efficiency for retrieving such content may be improved.

Though the illustrative elements of the routine 400 are described above in sequential order for clarity, in some embodiments, one or more elements of routine 400 may be carried out in alternative or non-sequential orderings. For example, in one embodiment, the concatenation server 112 may be configured to generate concatenated files in response to transmission of a content file identifying the component files (e.g., an HTML file), rather than in response to a request for a concatenated file. Illustratively, a web server, such as web server 114 of FIG. 1, may be configured to notify the concatenation server 112 when transmitting an HTML file including reference to a dynamically generated concatenated image to a user computing device. The concatenation server 112, in turn, may be configured to generate the referenced dynamically generated concatenated image based on the expectation that such a concatenated image will soon be requested by the user computing device. Accordingly, in such embodiments, blocks 404 and 406 may be carried out or implemented prior to block 402. One skilled in the art will appreciate that alternative sequences or arrangements of the elements of routine 400 may be implemented without departing from the scope of the present disclosure.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   as implemented by one or more computing devices configured with specific executable instructions,
   receiving a request from a user computing device for a display page;
   generating a display page file corresponding to the display page, wherein the display page file includes a link comprising identifiers of individual images of a plurality of images and identifying the plurality of images for inclusion within the display page as a concatenated image;
   transmitting the display page file to the user computing device;
   receiving, from the user computing device, a request for the concatenated image, wherein the request includes the identifiers of the individual images from the plurality of images, and wherein the request is generated at the user computing device responsive to processing of the link;
   retrieving the plurality of images;
   generating the concatenated image based at least in part on the plurality of images, wherein generating the concatenated image comprises combining image contents of the individual images of the plurality of images into a single image represented by the concatenated image; and
   transmitting the concatenated image to the user computing device, wherein the user computing device is configured to display the concatenated image within the display page.

2. The computer-implemented method of claim 1, wherein the display page is displayed within a browser application of the user computing device.

3. The computer-implemented method of claim 1, wherein the display page file includes hypertext markup language (HTML).

4. The computer-implemented method of claim 1, wherein the request for the concatenated image is received in accordance with hypertext transfer protocol (HTTP).

5. The computer-implemented method of claim 1, wherein the request includes a set of parameters for generating the concatenated image.

6. A system comprising:
   a data store configured to store specific computer executable instructions; and
   a processor in communication with the data store, the processor configured to execute the stored specific computer executable instructions in order to at least:
   receive a request for generation of a concatenated image, the request comprising a plurality of identifiers, individual identifiers of the plurality of identifiers identifying individual images within a plurality of images to be included within the concatenated image, wherein the request, including the plurality of identifiers, is generated responsive to processing, at a computing device, of a link within a content item file, the link including the plurality of identifiers, and wherein the content item file includes instructions to generate a content item on the computing device;
   retrieve the plurality of images;
   generate the concatenated image based at least in part on the plurality of images, wherein the concatenated image includes a single image representing a combination of image contents of individual images of the plurality of images; and
   transmit the concatenated image to the computing device, wherein the computing device is configured to generate the content item based at least in part on the concatenated image.

7. The system of claim 6, wherein the content item is a display page.

8. The system of claim 6 further comprising a data store configured to store the plurality of images.

9. The system of claim 6, wherein the processor is further configured to:
store the concatenated image within a cache;
receive, from another computing device, a second request for generation of the concatenated image;
retrieve the concatenated image from the cache; and
transmit the retrieved concatenated image to the other computing device.

10. The system of claim 6, wherein the processor is further configured to:
receive a request from the computing device for the content item;
generate the content item file corresponding to the content item, wherein the content item file includes the plurality of identifiers; and
transmit the content item file to the computing device.

11. The system of claim 10, wherein the processor is configured to retrieve the plurality of images and generate the concatenated image in response to transmission of the content item file to the computing device and prior to reception of the request for generation of the concatenated image.

12. The system of claim 10, wherein the link includes the plurality of identifiers within a uniform resource locator (URL).

13. The system of claim 6, wherein the request further identifies a location of at least one of the plurality of images.

14. The system of claim 13, wherein the processor is configured to retrieve the at least one image from the identified location.

15. A non-transitory, computer-readable medium containing computer-executable instructions for dynamically generating concatenated image files, the computer-executable instructions comprising:
first instructions that, when executed by a processor, cause said processor to:
receive a request for generation of a concatenated image, the request comprising a plurality of identifiers, individual identifiers of the plurality of identifiers identifying individual images within a plurality of images to be included within the concatenated image, wherein the request, including the plurality of identifiers, is generated responsive to processing, at a computing device, of a link within a content item file, the link including the plurality of identifiers, and wherein the content item file includes instructions to generate a content item on the computing device;
retrieve the plurality of images;
generate the concatenated image based at least in part on the plurality of images, wherein the concatenated image includes a single image representing a combination of image contents of individual images of the plurality of images; and
transmit the concatenated image to the computing device, wherein the computing device is configured to generate the content item based at least in part on the concatenated image.

16. The non-transitory, computer-readable medium of claim 15, wherein the first instructions further cause said processor to:
receive a request from the computing device for the content item;
generate the content item file corresponding to the content item, wherein the content item file includes the plurality of identifiers; and
transmit the content item file to the computing device.

17. The non-transitory, computer-readable medium of claim 15, wherein the request includes a set of parameters for generating the concatenated image.

18. The non-transitory, computer-readable medium of claim 17, wherein the set of parameters comprises at least one of a desired layout of the plurality of images within the concatenated image, a desired size of at least one of the plurality of images within the concatenated image, a desired size of the concatenated image, a desired format of the concatenated image, a desired compression for the concatenated image, or a desired distance between at least two of the plurality of images within the concatenated image.

19. The non-transitory, computer-readable medium of claim 17, wherein the set of parameters are determined based at least in part on a desired format of the concatenated image.

20. The non-transitory, computer-readable medium of claim 17, wherein the first instructions cause the processor to generate the concatenated image based at least in part on the set of parameters.

21. A computer-implemented method for outputting content including dynamically generated concatenated files, the computer-implemented method comprising:
as implemented by one or more computing devices configured with specific executable instructions,
receiving a content file comprising a link including a plurality of identifiers, individual identifiers of the plurality of identifiers identifying individual images, within a plurality of images, to be included within a content item as a concatenated image;
in response to processing of the link within the content file, transmitting a request for generation of the concatenated image, representing a combination of image contents of the plurality of images as a single image, to an image concatenation component, wherein the request comprises the plurality of identifiers collectively identifying the plurality of images that are to be included within the content item as a concatenated image, and wherein the image concatenation component is configured to generate the concatenated image based at least in part on the individual images within the plurality of images;
receiving the generated concatenated image from the image concatenation component; and
outputting the content item including the concatenated image.

22. The computer-implemented method of claim 21, wherein the content file further identifies a location of the image concatenation component.

23. The computer-implemented method of claim 22, wherein the location of the image concatenation component corresponds to a URL.

24. The computer-implemented method of claim 23, wherein transmitting the request for generation of the concatenated image corresponds to transmitting a request for the concatenated image to the URL.

* * * * *